(12) United States Patent
Travere

(10) Patent No.: US 7,198,469 B2
(45) Date of Patent: Apr. 3, 2007

(54) WIND GENERATOR OF THE TYPE WITH AUTOMATIC POWER REGULATION

(75) Inventor: Pierre Travere, Six Fours (FR)

(73) Assignee: Travere Industries, Six Fours (FR)

( * ) Notice: Subject to any disclaimer, the term of this patent is extended or adjusted under 35 U.S.C. 154(b) by 107 days.

(21) Appl. No.: 10/541,177

(22) PCT Filed: Dec. 23, 2003

(86) PCT No.: PCT/FR03/03888

§ 371 (c)(1),
(2), (4) Date: Jun. 30, 2005

(87) PCT Pub. No.: WO2004/061301

PCT Pub. Date: Jul. 22, 2004

(65) Prior Publication Data

US 2006/0171810 A1    Aug. 3, 2006

(51) Int. Cl.
*F03D 11/00* (2006.01)
(52) U.S. Cl. .................. 416/139; 416/140; 416/147
(58) Field of Classification Search .............. 416/46, 416/52, 153, 147, 139, 140, 206, 111; 290/44, 290/55
See application file for complete search history.

(56) References Cited

U.S. PATENT DOCUMENTS

| 1,461,048 A | * | 7/1923 | Roman ................. 416/51 |
| 2,139,954 A | * | 12/1938 | Hartley ................. 416/52 |
| 4,671,742 A | * | 6/1987 | Gyimesi ................. 417/131 |

FOREIGN PATENT DOCUMENTS

| DE | 805 388 | 5/1951 |
| DE | 31 15202 A1 | 11/1982 |
| FR | 1 553 046 | 1/1969 |
| FR | 2 313 576 | 12/1976 |
| FR | 2 401 331 | 3/1979 |
| FR | 2 415 211 | 8/1979 |
| FR | 2 506 853 | 12/1982 |
| GB | 2 010 980 A | 7/1979 |

* cited by examiner

*Primary Examiner*—Ninh H. Nguyen
(74) *Attorney, Agent, or Firm*—Fish & Richardson P.C.

(57) ABSTRACT

The invention relates to a wind generator of the type with automatic power regulation, comprising at least one propeller having at least two blades (21), whereby the efficiency of one propeller varies inversely to a variation in the wind energy, from a lower wind speed limit. The torque/speed characteristics of each propeller are determined such that the working point begins to move towards the areas of low aerodynamic efficiency when the wind speed approaches the value at which the generator reaches the maximum, safety-compliant power. The inventive wind generator is characterized in that it also comprises: at least one centrifugal counter weight system (24) which is arranged such as to reduce the pitch of at least one part of the blades when the speed of rotation is increasing; and at least one system comprising an end stop (30) and return (15) or compression (25) means which mechanically define the initial working pitch and the optimum working pitch up to the nominal speed. According to the invention, one part of the blades is pivot mounted to a shaft (23), thereby driving the end of at least one return spring (15) or compression spring (25) by means of at least one arm or lever (22) or similar device, said end maintaining the blade in contact with at least one fixed end stop element (30) defining the initial pitch.

8 Claims, 3 Drawing Sheets

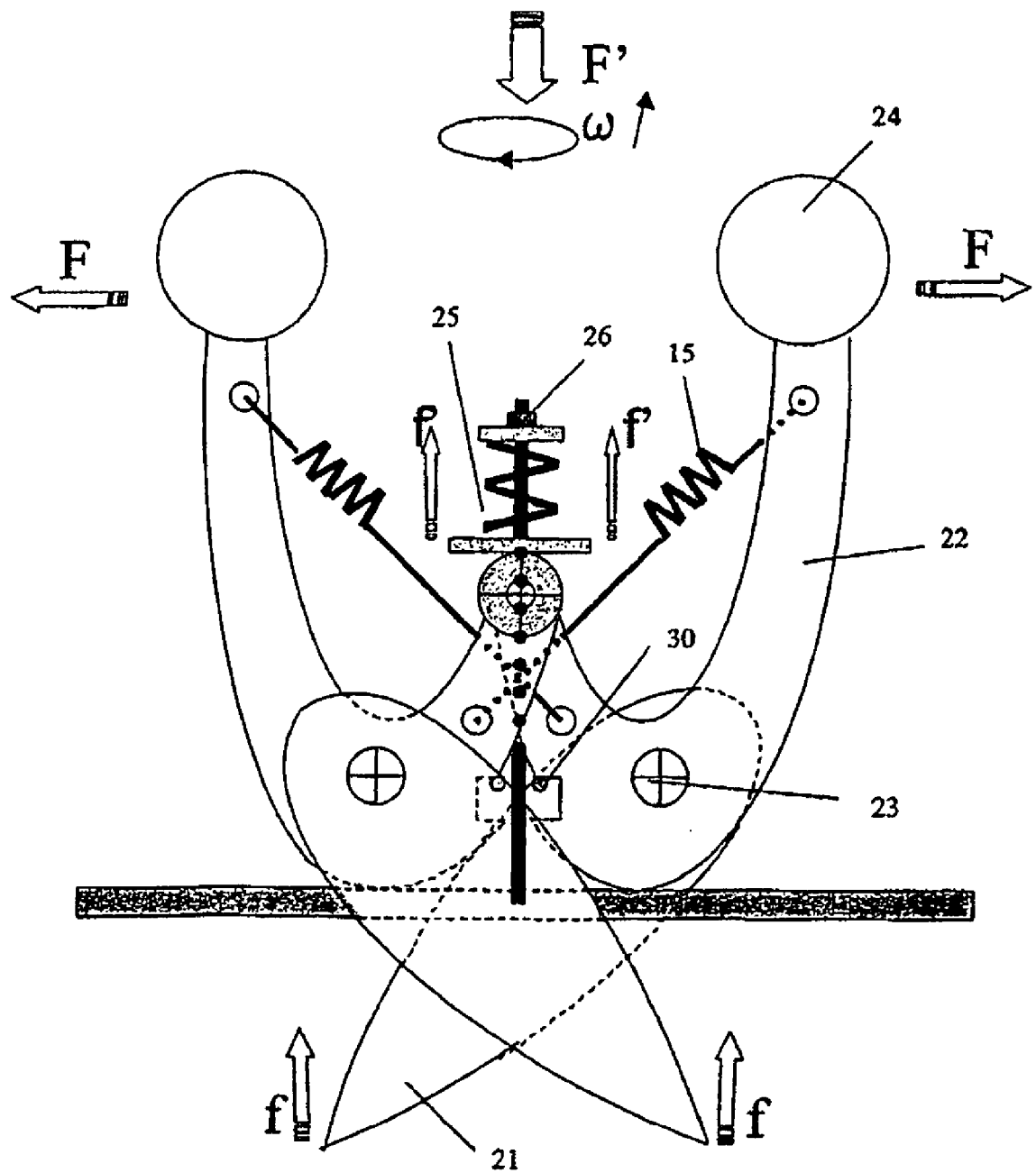

WIND GENERATOR OF THE TYPE WITH AUTOMATIC POWER REGULATION

FIELD OF THE INVENTION

Figure 1:
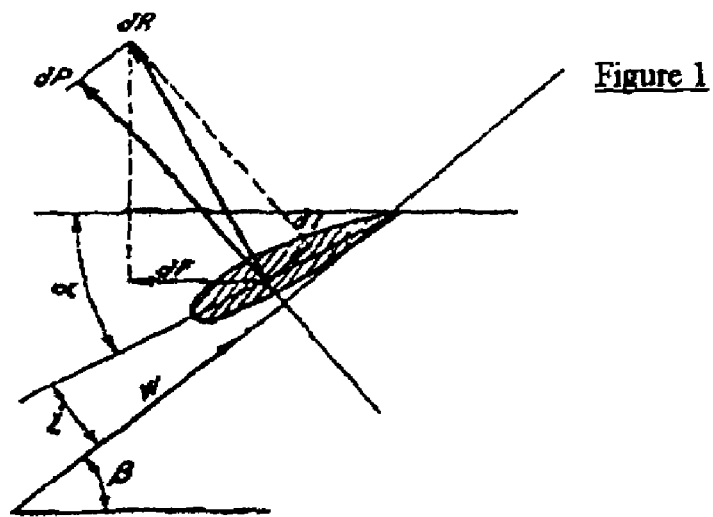

Wind energy has been used for a long time by means of rotating sails. Windmills are thus known that are provided with wings or blades, generally four in number; but these mills are mostly usable in countries where the winds are more or less regular and always or nearly always blowing in the same direction.

At the present time, more interest is taken in what are commonly called wind generators or "wind generators", devices in which the blades are metal or made from composite materials and therefore relatively non-deformable. Perfected wind generators provide suitable efficiencies with, for example, a tail unit forming a fin and which ensures the keeping of all the mobile elements (for example blades) parallel with the direction of the wind, whatever the direction of the wind may be, in the so-called "feathered" position, in order to present minimal resistance to the wind, or in the position opposite to the feathered position, and therefore the position perpendicular to the direction of the wind, with in this case maximum resistance to the wind. When a driving wheel is used for the correct operation of the blades, certain devices make provision for withdrawing this driving wheel from the wind by presenting it sideways in the case of a storm.

Wind generators, as is known, can be used for various applications: pumping water in agricultural applications, supply of electrical energy, and also the supply of hot water by using the heat produced when braking the blades when it is appropriate to slow them down for whatever the reasons may be.

It is important for the correct functioning of wind generators to provide various types of improvements; in fact on wind generators with a single blade or with several blades, two for example, as these blades all have large diameters, the speeds of rotation can be very high and thus generate stresses that are difficult to control. Hence air turbines are sometimes constructed with a small rotor diameter and with a long axial length, placed at the "convergent" outlet and which protects them from limiting peripheral stresses.

The present invention here relates more particularly to the adequate control of the speed of rotation of the wind generators, particularly in violent wind, that is to say when the maximum amount of energy is being retrieved but the tips of the blades become too fast and threaten the soundness or at least the wear of numerous mechanical parts of the wind generator assembly. More precisely, the device of the invention relates to the automatic regulation of the pitch of the propeller of a wind generator.

BACKGROUND OF THE INVENTION

In the prior art, wind generators include a regulation device driven by the driving shaft of the propeller (of which a mobile regulation shaft is generally coaxial with the driving shaft (FR-2415211).

In FR-2401331, there is described an automatic device for adjusting the pitch of the driving propeller of a wind generator by means of rollers or rods engaged in grooves forming cams arranged in plates carried by each of the shafts of the blades. The blades can also be actuated by "eccentrics" driven against the action of springs by flyweights bound in rotation to the wheel. In the literature there are also found means incorporating "eccentrics" driven by the wind itself (FR 2415211) or by a central device controlled by means of the wheel and whose translation can be provided for example by means of a watt regulator (FR 2401331) or a screw-bolt system reacting to the difference in speed between that of the wheel and that of a motor rotating at a reference speed (FR 2313576).

The device according to the invention makes it possible not only to solve the problem of violent winds but it also makes it possible, by means of a large pitch in the absence of wind, to facilitate the starting of the propeller, this pitch then reducing down to an optimum value and then increasing if the wind increases, or even to become feathered in the case of gusts.

Basic information on wind generators will furthermore be able to be found in the French patent FR 2.500.077.

Without going into detail, it is recalled briefly that another type of wind generator, like the one that is the subject of the invention, is directed towards the wind by a fin; the movement is transmitted to the base of the wind generator by a universal joint and a shaft which drives flyweights rubbing on a cylinder.

SUMMARY OF THE INVENTION

The present invention relates to the regulation of power of a wind generator propeller coupled to a generator by giving the blades of this propeller (there are at least two blades, for example two or four) a profile such that the efficiency of this propeller varies inversely with respect to the variation of the energy of the wind. For this purpose, the torque/speed characteristics of the propeller are determined such that the operating point starts to move towards the zones of low aerodynamic efficiency when the speed of the wind approaches the value for which the generator reaches the maximum power compatible with safety as divulged in the French patent N° 1.553.046.

MORE DETAILED DESCRIPTION

In this patent FR-1553046, the essential part of the regulation is acquired without movement of the blades thus resulting in a greater stability of the regulation than in the usual variable pitch systems which reduce the power by increasing the angle setting; the system described in the French patent N° 1.553.046 added an important improvement by being provided with a system of centrifugal flyweights arranged in such a way as to reduce the setting angle of a part of the blades when the speed of rotation tends to increase, it being also provided with a system of stops and means of return against these stops which mechanically define the initial angle setting and the optimum operational angle setting up to the nominal speed. Generally the blade is pivoting about a spindle and drives, by the intermediary for example of an arm, the end of a return spring which tends to maintain the blade in contact with a fixed stop which defines the initial angle setting. The French patent N° 1.553.046 describes a certain type of spring assembly, an assembly which, whilst being very correct, does not have the advantages of the present invention, also incorporating a system of flyweights and arms but with an original arrangement of at least one spring.

In general, the blade or a part of that blade, can constitute the centrifugal flyweight system. It is also possible to envisage mounting the flyweight at the end of an arm integral with the blade, or part of blade. The arm bearing the flyweight and the arm for attachment of the spring can then form one and the same bellcrank lever.

A variant provides a blade, or part of blade, integral with a heel-piece arranged to drive the mobile end of a second spring, this end being retained by a second fixed stop when the blade or part of blade has rotated through a certain angle. In this case, the first stop corresponds to an initial angle setting which provides a high starting torque and the second stop (main stop) corresponds to the optimum operational angle setting up to the nominal speed. This second spring can be attached to a secondary arm which pivots about the axis of rotation of the blade. This spring brings this secondary arm into contact with the first stop. Eventually, this second spring bears by its free end against the second fixed stop; the heel-piece is then disposed in such a way as to drive this end directly after the rotation of the blade.

Figure 2:
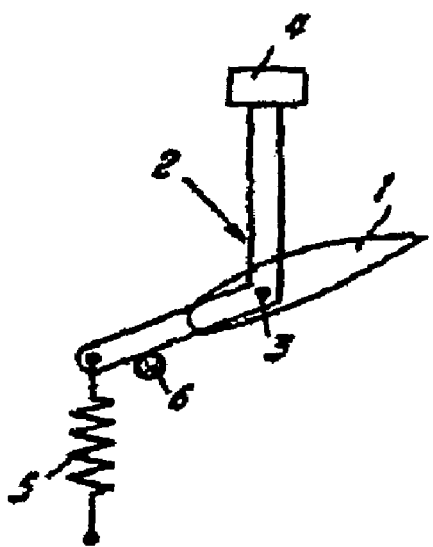
Figure 3:
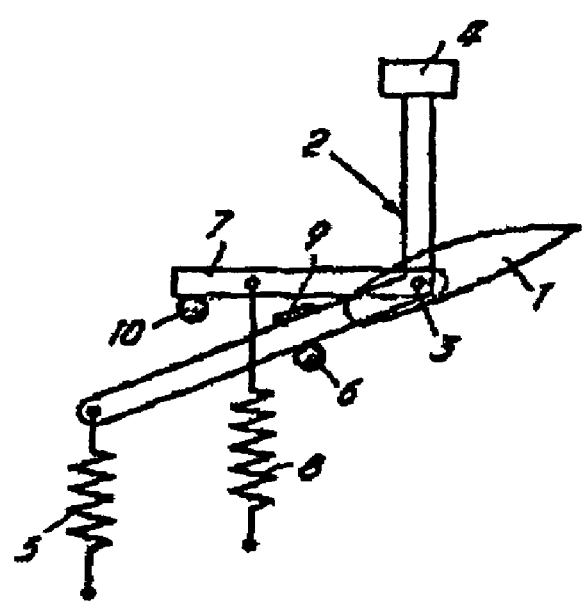

FIGS. 1, 2 and 3 are taken from the French patent N° 1.533.046 and illustrate the techniques that the present invention improves.

FIG. 1 shows a blade element and the components of the forces which result from the action of a wind W of angle beta on the blade element whose angle setting angle is alpha; dP is the lift proportional to the angle of incidence i which is the difference between beta and alpha; if the wind generator is lightly loaded, the low values of dF correspond to low values of dP, and consequently to low values of i; the variations of angle setting alpha substantially follow those of the wind angle (beta); the inevitable variations of incidence result in large variations in the forces applied to the blades of propellers, resulting in heavy wear of the pitch variation mechanisms.

In FIG. 2, the blade 1 is provided with a pitch variation mechanism constituted by a bellcrank lever 2 integral with the blade and mounted such that it pivots about the axis 3 perpendicular to the axis of rotation of the blade. At one of the ends of the lever 2, there has been fixed a flyweight 4 and at the other end there has been attached a return spring 5. A stop 6 determines the initial angle setting alpha of the blade.

In FIG. 3, in addition to the main lever 2, connected to the blade 1 and returned by the spring 5, there is a second lever 7 mounted on the same axis 3 as the lever 2 and returned by a spring 8 into contact with a stop 10. On the lever 2, there has been fixed a heel-piece 9 disposed in such a way as to be able to drive the lever 7 against the action of the spring 8 when the lever 2 has pivoted though a certain angle. As indicated in FR 1.553.046, the spring 5, rather flexible, is the starting spring and the stop 6 corresponds to an initial angle setting sufficiently large to ensure a high starting torque. At half-speed the angle setting alpha occurs again corresponding to the main stop 10. This angle setting remains constant up to the nominal speed beyond which the angle setting is reduced and the main pre-stressed spring 8 is put under load.

In this French patent N° 1.553.046, the springs used work in tension and the details of this patent are specifically limited to these tensions. In the present invention, it has been discovered that it could be very advantageous, subject to there being some original devices, to use either at least one system with at least two springs arranged differently from the arrangement in FIGS. 2 and 3 (see FIG. 4) or even more advantageously at least one spring working not in tension but in compression (see FIG. 5). But, according to the invention, it can also be very advantageous to use a mixed technique combining both the devices of FIGS. 4 and 5, this mixed technique being illustrated in FIG. 6.

In fact it is appropriate to emphasize that the regulation is always carried out in the condition of aerodynamic stalling, a system in which the resultant dR (see FIG. 1) varies very little and the variation in angle setting necessary for this regulation is very small. Because of this, various imperatives must be taken into account. In fact, the angle dR with the perpendicular to the chord of the profile never exceeds, in a forward direction, a value of about ten degrees such that it suffices to reduce the angle setting by an angle (alpha+10°) in order to be assured that the driving component becomes negative. The regulation is finally obtained not by variation of dP but by variation of the angle dR with the plane of rotation.

In brief, due to the mechanism according to the invention, at least one flyweight system acts against the return force of the spring or springs when the speed of rotation tends to increase and causes a reduction of the angle setting. Furthermore, the devices according to the invention make it possible to provide an initial angle setting that is very much higher than alpha in order to ensure a very high starting torque.

Another advantage of the devices according to the invention is to envisage the regulation, no longer with the totality of the blade, but with one element only, for example with the ends of the blades which are aerodynamically more active.

Figure 4:
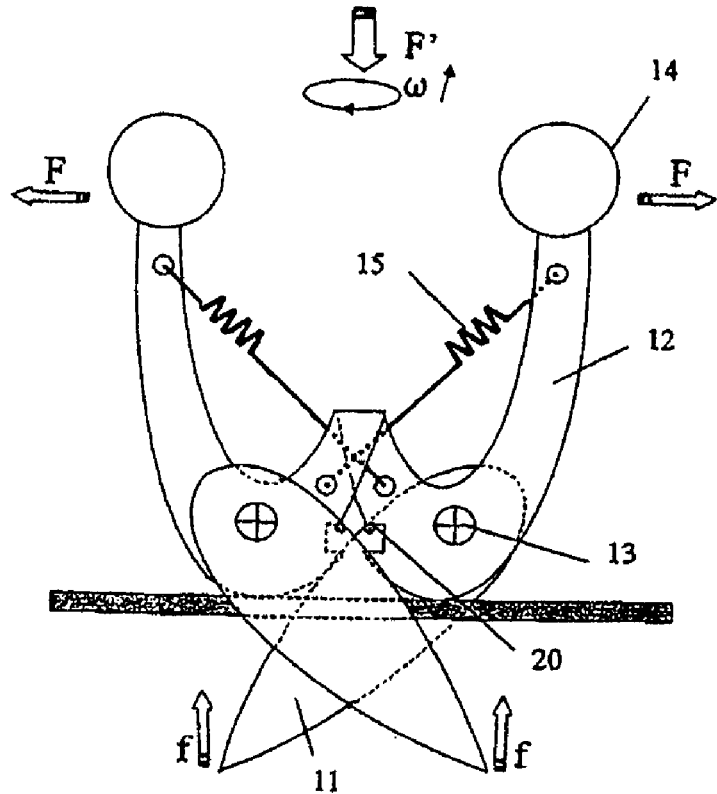

The succinctly schematized FIG. 4 shows a first aspect of the invention. It describes a device which comprises at least two blades 11. Each of them is integral with a bellcrank lever 12 (or a bellcrank arm or any equivalent means), each of the bellcrank levers being mounted such that they pivot about an axis 13 (the figure here showing a system with two blades and therefore with two axes) these axes are perpendicular to the axes of rotation of the blades. At each of the ends of the levers 12 is fixed a flyweight 14 and at the other end of each lever 12 is attached a return spring 15, each of the springs being attached according to the invention on the one hand to a flyweight 14 integral with one of the blades and, on the other hand, to the end of a lever 12 integral with another blade. Thus for example, in FIG. 4 representing a system with two blades, comprising two levers, two flyweights and two springs, the two springs face each other, each one being attached, on the one hand, to each of the two flyweights which face each other symmetrically with respect to a plane perpendicular to the two bellcrank levers and each of these two springs being attached, on the other hand, to the opposite end of the lever to that which connects the spring to the flyweight, this end, called opposite, in fact being the end of the lever connected to the other flyweight. In other words, each spring connects the flyweight attached to a lever to the end of the other lever attached to the other flyweight.

Moreover, a fixed stop 20 corresponds to each lever, in this case therefore at least two stops 20 which determine the initial angle setting alpha of each blade. An arrow F' is the indication of the direction of the wind W and the other arrows F indicate the separation of the flyweights, the arrows f indicating the rising of the blades. The levers lower by the centrifugal effect applied to the flyweights in rotation under the effect of the wind whilst the springs lengthen and apply tension in the opposite direction on the flyweights, thus maintaining the correct functioning of the wind generator.

In this case there are therefore at least two blades (preferably two blades) with direct action of one blade on the other with, furthermore, the following two advantages:

Stabilization and damping on the one hand: there is in fact a minimum amount of vibration and noise due to the direct damping effect of the force differential on the blades due to the wind differential between the blade in the high position and the blade in the low position and the passage in front of the mast of the blade in the low position.

Absence on the other hand of linkage and of wearing part, which is a considerable advantage in comparison with the devices of the prior art.

Figure 5:
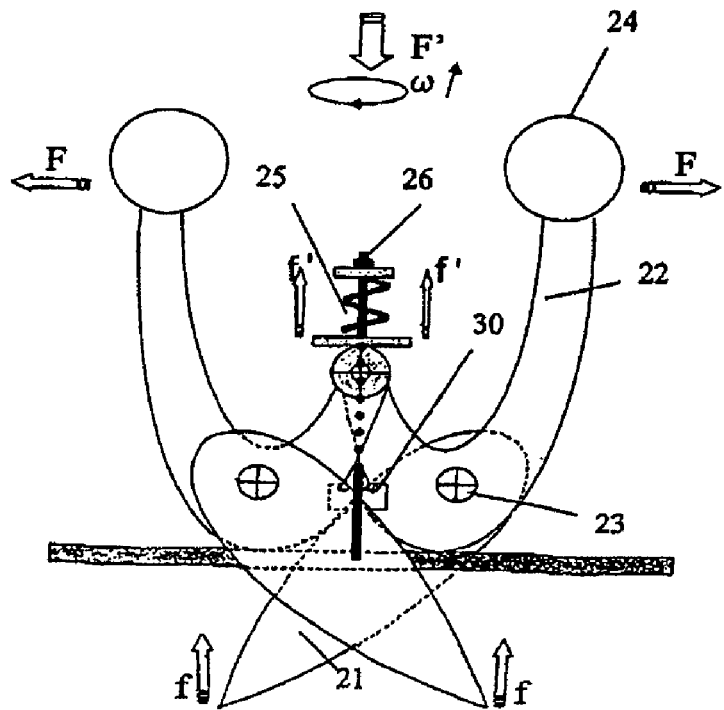

FIG. 5 shows a second variant of the invention, namely a device functioning with the help of a spring that is compressed and not under tension.

In FIG. 5, the device according to the invention comprises a set of at least two blades 21 (preferably two blades), each integral with a bellcrank lever 22 (in this case preferably two bellcrank levers 22); each bellcrank lever is connected to a flyweight such as 24. Each of these bellcrank levers pivots about an axis 23 perpendicular to the plane of the blades or of the bellcrank levers. According to the invention, the improvement consists not in using a spring connected on the one hand to a flyweight and on the other hand to an end of a bellcrank lever, a bellcrank lever other than the one which is connected to the flyweight, but in using a spring functioning "in compression" and not in tension, this spring being connected at its base to at least two stops 30 and this spring being connected at its top to a fixed nut 26. In this variant of the invention, when the levers lower by centrifugal effect applied to the flyweights rotating under the effect of the wind, thus driving the ends of the bellcrank levers upwards, the spring is compressed and applies an action in the opposite direction on the flyweights, thus maintaining the correct functioning of the wind generator.

The two flyweights, in FIG. 5, separate as indicated in the figure (arrows F) with a rising of the blades (arrows f), the arrows f' indicate the direction of the compression or decompression. The arrow F' indicates the flow of the wind W.

In this case there is therefore angle setting by compressed spring which in particular furthermore provides two advantages:

On the one hand an effect of stabilization and damping, as a mean position resulting from the forces applied by all of the blades, and by the presence of this compressed spring, with a minimum of noise and vibration.

On the other hand, the absence of linkage and wearing part.

It is also possible to add a third non-negligible advantage: the regulation of the speed of rotation is carried out very easily by simple variation of the initial or "off load" compression of the spring.

FIG. 6 shows what was referred to above as the "mixed technique". This FIG. 6 is identical to FIG. 5, that is to say it is characterized by the presence of at least one spring 25 operating in compression, but it furthermore comprises at least two springs 15 identical to those which are shown in FIG. 4. In this case the invention combines the advantages of the two FIGS. 4 and 5. The function of the spring 25 is mostly a damping action. The function of the springs 15 is mostly a stabilization function. The combined action of the two types of support results in:

A major damping function of the springs such as 15. A major stabilization function in the average position of adjustment of the central spring (functioning in compression).

This mixed technique offers increased sensitivity of the regulation by minimization of the stiffness of said central spring.

It will therefore be noted that one of the characteristics of the present invention is essentially the fact of having at least one pair of blades, certain elements of one blade being connected to the elements of the other blade. In particular, each spring connects the flyweight attached to a lever to the other end of the other lever attached to the other flyweight as described above. This type of device does not appear in other improvements of wind generators described in particular in DE 3115202 or in DE 805388 or in FR-A-2817298.

In these documents, the blades are independent of each other and are not linked to each other for example by the presence of a return spring of one blade connected to an element of another blade, or by the presence of a flyweight being connected to a flyweight of another blade.

The invention claimed is:

1. A wind generator of the type with automatic power regulation comprising at least two blades of at least one propeller, the efficiency of a propeller varying inversely with respect to the variation of the energy of the wind, starting from a lower limit of the speed of the wind, the torque/speed characteristics of each propeller being determined such that the operating point starts to move towards the zones of low aerodynamic efficiencies when the speed of the wind approaches the value for which the generator reaches the maximum power compatible with safety, the wind generator being characterized in that it also comprises at least one system of centrifugal flyweights arranged in such a way as to re-duce the angle setting of at least a part of the blades when the speed of rotation tends to increase, at least one system of stops and means of return or compression which mechanically define the initial angle setting and the optimum operational angle set-ting up to the nominal speed, a part of the blades being mounted such that it pivots about an axis thus driving by the intermediary of at least one arm or lever or similar device, the end of at least one re-turn spring or of a compression spring, tending to maintain it in contact with at least one fixed stop defining the initial angle setting, the wind generator also being characterized in that in each pair of blades elements of one blade are connected to elements of the other blade.

2. The wind generator as claimed in claim 1 comprising at least two blades, each of them being integral with a bellcrank lever or bellcrank arm or similar means, each lever pivoting about an axis substan-tially perpendicular to the plane containing said bellcrank lever (or plane of the blades) and on the one hand being fixed to a first flyweight and on the other hand being connected to a first spring, this first spring, functioning in tension, being attached on the one hand to said first flyweight and on the other hand to the end of another lever itself fixed on the one hand to another flyweight which is different from said first flyweight and on the other hand to another spring which is different from the first spring and also functioning in tension.

3. The wind generator as claimed in claim 2, comprising a pair of two blades, of two levers, of two fly-weights and of two springs.

4. The wind generator as claimed in claim 3, characterized in that the wind generator comprises two blades 11, each of them being integral with a bellcrank lever 12, the device thus comprising two bellcrank levers 12, each of the bellcrank levers being mounted pivoting about an axis 13, these two axes being perpendicular to the axes of rotation of the blades, each of the ends of the levers 12 being fixed to a flyweight 14, the other end of each lever 12 being attached to a return spring 15, each of the two springs being attached on the one hand to a different flyweight 14 and on the other hand to the end of a lever 12, the two springs facing each other, each one therefore being attached on the one hand to one of the two flyweights which face each other symmetrically with respect to a plane perpendicular to the two bellcrank levers and each one of these two springs being attached on the other hand to the opposite end of the lever to that which connects the spring to the flyweight, this end, called the opposite end, in fact being the end of the lever connected to the other flyweight, each spring thus connecting the flyweight attached to one lever to the end of the other lever attached to the other fly-weight, the wind generator furthermore comprising a stop 20 corresponding to each lever, that is to say two stops 20, which determine the initial angle set-ting alpha of each blade, F' being the indication of the direction of the wind W and the other arrows F and f indicating the movements of the flyweights and of the blades respectively.

5. The wind generator as claimed in claim 1 comprising a set of at least two blades 21, each integral with a bellcrank lever 22, each bellcrank lever being connected to a flyweight such as 24, each of these bellcrank levers pivoting about an axis 23, the wind generator furthermore comprising at least one spring functioning in compression, this spring being connected on the one hand at its base to at least two stops disposed at one of the ends of each of the levers and on the other hand at its top to a fixed nut 26.

6. The wind generator as claimed in claim 5, comprising two blades 21, two bellcrank levers 22, two fly-weights 24, each bellcrank lever being connected to one of the two flyweights 24, each of these bellcrank levers pivoting about an axis 23, the device comprising at least one spring 25 functioning "in compression", this spring being connected at its base to at least two stops 30 and this spring being connected at its top to a fixed nut 26, the two flyweights separating in the direction of the arrow F, with movement of the blades in the direction of the arrows f, f' being the direction of compression and F' being the direction of the wind W.

7. The wind generator as claimed in claim 1, comprising a set of at least two blades 21, each one integral with a bellcrank lever 22, each bellcrank lever being connected to a flyweight such as 24, each of these bellcrank levers pivoting about an axis 23, the wind generator being characterized on the one hand in that it comprises at least one spring functioning in compression, this spring being connected on the one hand at its base to at least two stops disposed at one of the ends of each of the levers 22 and on the other hand at its top to a fixed nut 26, the wind generator being characterized on the other hand in that it comprises at least two other springs 15, called return springs, functioning in tension and each one being attached on the one hand to a flyweight and on the other hand to an end of a bellcrank lever with an arrangement such that each of the ends of the levers 22 is fixed to a flyweight 24, the other end of each lever 22 being attached to one of said return springs 15, each of the two springs being attached on the one hand to a different flyweight 24 and on the other hand to the end of a lever 22, the two springs facing each other, each one therefore being attached on the one hand to one of the two flyweights which face each other symmetrically with respect to a plane perpendicular to the two bellcrank levers and each one of these two springs being attached on the other hand to the opposite end of the lever to that which connects the spring to the flyweight, this end, called the opposite end, in fact being the end of the lever connected to the other flyweight, each spring thus connecting the flyweight attached to one lever to the end of the other lever attached to the other fly-weight, the wind generator furthermore comprising at least one stop 30 corresponding to each lever, which determine the initial angle setting alpha of each blade, the arrow F' being the indication of the direction of the wind W and the other arrows F and f indicating the movements of the flyweights and of the blades respectively.

8. The wind generator as claimed in claim 7, comprising two blades 21, two bellcrank levers 22, two fly-weights 24, two axes 23 and two stops 30, each bell-crank lever 22 being connected to one of the two flyweights 24, each of these bellcrank levers pivoting about one of said axes 23, the wind generator comprising at least one spring 25 functioning "in compression", this spring being connected at its base to at least the two stops 30 and this spring being connected at its top to a fixed nut 26, the two flyweights separating in the direction of the arrow F, with movement of the blades in the direction of the arrows f, the wind generator also comprising two return springs 15, each of them being fixed on the one hand to the end of one of the two levers 23 and on the other hand to a flyweight 24 attached to the other lever.

* * * * *